United States Patent [19]

Eldred

[11] 4,158,617
[45] Jun. 19, 1979

[54] RADIATION CURED AND MONOMER MODIFIED SILICON ELASTOMERS

[75] Inventor: Roger J. Eldred, Detroit, Mich.

[73] Assignee: General Motors Corporation, Detroit, Mich.

[21] Appl. No.: 664,662

[22] Filed: Mar. 8, 1976

[51] Int. Cl.$^2$ .................. C08F 283/12; C08F 2/54
[52] U.S. Cl. .................. 204/159.13; 260/42.26; 260/827
[58] Field of Search .............. 204/159.13; 260/37 SB, 260/42.15, 42.26, 827

[56] References Cited

U.S. PATENT DOCUMENTS

| | | | |
|---|---|---|---|
| 2,763,609 | 9/1956 | Lewis et al. | 204/159.13 |
| 3,627,836 | 12/1971 | Getson | 260/827 X |
| 3,632,399 | 1/1972 | Burlant et al. | 204/159.13 X |
| 3,696,068 | 10/1972 | Creamer | 204/159.13 X |
| 3,723,167 | 3/1973 | Nordstrom | 260/827 X |
| 3,865,588 | 2/1975 | Ohto et al. | 204/159.13 X |
| 3,916,033 | 10/1975 | Merrill | 204/159.13 |
| 4,014,851 | 3/1977 | Bluestein | 260/37 SB X |
| 4,016,333 | 4/1977 | Gaske et al. | 260/827 X |
| 4,026,826 | 5/1977 | Yoshida et al. | 260/827 X |

*Primary Examiner*—Wilbert J. Briggs, Sr.
*Attorney, Agent, or Firm*—Jack I. Pulley

[57] ABSTRACT

In accordance with a preferred embodiment of this invention, a tear resistant silicone elastomer, which has improved elongation properties, is produced. This elastomer is the radiation induced reaction product of a noncured methyl vinyl silicone resin (VMQ) and uniformly dispersed therein a blend of a polyfunctional acrylic crosslinking monomer and a filler.

8 Claims, 1 Drawing Figure

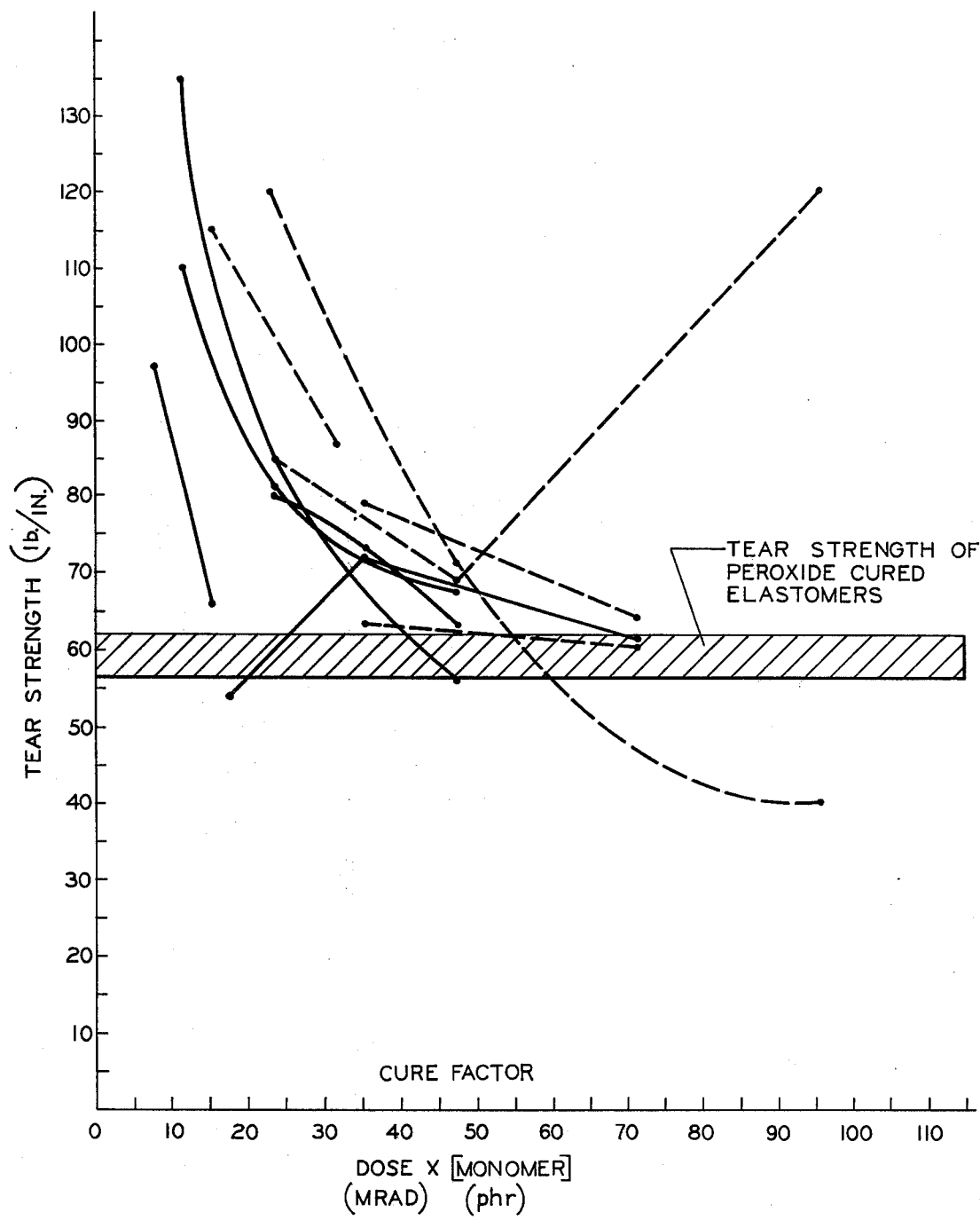

RADIATION CURED AND MONOMER MODIFIED SILICON ELASTOMERS

FIELD OF THE INVENTION

This invention relates to radiation cured silicone elastomers.

BACKGROUND OF THE INVENTION

Silicone elastomers are uniquely suitable for many applications because of their high temperature serviceability. However, several weaknesses have limited the use of these materials; these include low tear strength, poor abrasion resistance and a relatively poor high temperature oil resistance.

OBJECTS PROVIDED BY THIS INVENTION

This invention provides improved silicone elastomers which are the high energy radiation induced reaction product of a uniform blend of an uncured silicone resin and a mixture of a filler and a cross-linking monomer such as trimethylolpropanetrimethacrylate and/or polyethylene glycol dimethacrylate.

More specifically, this invention provides radiation cured silicone elastomers which have greater tear strength and better elongation properties than the conventional peroxide cured silicone elastomers. The subject elastomers are the high energy radiation induced reaction product of a uniform mixture of an uncured silicone resin having a substituent vinyl group and a uniform blend of a cross-linking monomer selected from the group consisting of trimethylolpropanetrimethacrylate and/or a polyethylene glycol dimethacrylate and a filler.

This invention further provides articles such as seals, spark plug boots, electrical wire insulation and the like which articles are made from the subject improved silicone elastomers and which are characterized by high temperature serviceability and improved tear strength, improved elongation properties or improved high temperature oil resistance.

This invention also provides a method of producing radiation cured and monomer modified silicone elastomers which have improved physical properties such as tear strength, elongation and high temperature oil resistance.

This invention still further provides radiation cured, monomer modified, silicone elastomers which have elongation properties equivalent to the conventional peroxide cured elastomers, but which elastomers also have a higher degree of cure and the accompanying improvement in properties caused thereby, and a method of forming same.

SUMMARY OF THE INVENTION

In accordance with a preferred embodiment of this invention, these and other objects are accomplished by providing a radiation curable composition containing an uncured, that is, noncross-linked, silicone resin having pendent vinyl groups, and uniformly dispersed therethrough a blend of a reinforcing filler, such as silica, and a polyfunctional, acrylic, cross-linking monomer having two or more points of ethylenic unsaturation and selected from the group consisting of trimethylolpropanetrimethacrylate (hereinafter TMPT) and polyethylene glycol dimethacrylate (hereinafter PEGDMA). This composition is cured by exposing it to a high energy electron beam radiation.

When the cross-linking monomer concentration is held within the range of from about 2 to 8 parts, by weight, per 100 parts of silicone resin and the radiation dose is within a range of from about 2 to about 8 Mrads and the product of these two parameters is maintained below about 20, then the resulting silicone elastomer exhibits a tear strength which is almost twice that of the conventional peroxide cured silicone elastomers and an elongation at break which is about 50% greater than that of the peroxide cured elastomers.

Comparatively, the degree of cure may be carried further by increasing either the monomer concentration or the radiation dose, or both, to improve other properties. For example, by maintaining about the same limits on the monomer concentration and the radiation dose but allowing their product to increase to from about 20 to about 40, silicone elastomers having improved high temperature oil resistance are produced. This improvement is achieved at elongation values which are equivalent to those of the conventional peroxide cured silicone elastomers. The improvement in high temperature oil resistance without a substantial loss in elongation significantly increases the number of applications in which these elastomers may be used.

In addition, the use of the subject method of producing silicone elastomers does not preclude the practitioner from using any of the typical additives or fillers which he has used in the past to tailor the properties of conventional peroxide cured silicone elastomers. Therefore, the practitioner maintains the flexibility of formulating silicone elastomers in view of the requirements of his specific application and he also receives the benefit of a significant improvement in certain properties. In addition, the subject technique of curing silicone elastomers may provide significant energy savings when compared to the typical peroxide curing technique employing heat to trigger the action of the peroxide curing agent.

To more effectively describe the suitable degrees of cure for the subject composition, the term "cure factor" is used. This term is defined as the product of the cross-linking monomer concentration in parts by weight per one hundred parts of uncured silicone elastomer (phr) and the radiation dose in Mrads. This term is used because the conventional method of indicating the degree of cure, volume swell ($v_2$) data, does not correlate well with either the tear strength or elongation data. The "cure factor" of the subject elastomeric composition should not exceed a value of about 20, if the practitioner desires both the improved tear strength and abrasion resistance. However, the degree of cure may be carried further if the practitioner desired improvements in other properties such as tear strength and high temperature oil resistance and does not need improved elongation properties.

The "cure factor," as defined above, has been selected to describe the extent of cure since, within limits, it is theoretically possible to reduce the monomer concentration and increase the radiation dose to obtain the same degree of cure, and vice versa. Nevertheless, in the subject method of curing silicone elastomers, there are upper limits on the monomer concentration and radiation dose which may not be exceeded in an attempt to compensate for a lower quantity of the other regardless of the resulting cure factor. For example, if improved tear resistance and higher elongation at break are desired, the monomer concentration should not exceed about 8 parts by weight per 100 parts by weight of uncured silicone resin and the dose should not exceed about 8 Mrads, and in addition, the cure factor should not exceed about 20. If, however, the practitioner desires improved high temperature oil resistance without a loss of elongation, then the cure factor may be increased to as high as about 45, but the general limits on the monomer concentration and the dose do not change.

These and other advantages of the subject invention will be more easily understood in view of a detailed description thereof which refers to the attached graph which is a plot of the tear strength of the elastomer as a function of the "cure factor."

DETAILED DESCRIPTION OF THE INVENTION

Suitable uncured silicone resins include methyl vinyl silicones, such as the dimethyl methyl vinyl silicones, and the methyl phenyl vinyl silicones. Hereinafter, the vinyl methyl silicones will be referred to as VMQ resins, and the phenyl, vinyl methyl silicones as PVMQ resins. This designation is in accordance with the specification put forth in ASTM D-1418-72a. In this designation, the V indicates a vinyl substituent, the M indicates a methyl substituent, the P indicates a phenyl substituent, and the Q indicates the silicone backbone. The Dow Corning Corporation markets the VMQ resins under the tradename Silastic 430 and the PVMQ resins under the tradename Silastic 440. The 430 resin is preferred because it does not contain a phenyl group which acts as a free radical sink and which may retard the curing process. Typically, PVMQ resins contain from about 5% to about 10% by weight of the phenyl substituent and both the VMQ and the PVMQ resins contain from about 0.2% to about 0.6% by weight of the vinyl substituent.

Suitable acrylic cross-linking monomers include: trimethylolpropanetrimethacrylate (TMPT) and any of a family of polyethylene glycol dimethacrylates (PEGDMA). Typically, the polyethylene segment is a tetraethylene glycol. The ethylene glycol segment, however, may vary considerably in molecular weight from about 100 to about 500 or more. As the molecular weight of the polyethylene exceeds this range by a significant amount, however, the elastomer begins to change its properties because a new and different resin is incorporated into the polymer matrix. Suitably, from about 2 to about 8 parts by weight of a cross-linking monomer are employed per 100 parts of the silicone resin.

Typically, fillers have been termed either reinforcing or semi-reinforcing depending on the physical properties of the filled elastomer once it has been cured. Suitable reinforcing fillers include but need not be limited to: (1) fumed colloidal silica, marketed under the tradename Cabosil by the Cabot Corporation, (2) precipitated, hydrated silica having a particle size of about 0.02 microns and marketed under the tradename HiSil by the Pittsburgh Plate Glass Company, and (3) precipitated, hydrated amorphous silica marketed under the tradename Silene D, and having a particle size in the range from about 0.08 to about 0.12 microns. Typically, the reinforcing fillers may be added at a concentration of from about 20 to about 70 or 80 parts by weight for each 100 parts by weight of uncured silicone resin. The preferred filler concentration and type will depend on the practitioner's intended application.

Suitable semi-reinforcing fillers include diatomaceous earth such as that marketed by the Johns Manville Corporation, under the tradename Celite and having a particle size within the range of from about 1 to about 10 microns. Ground quartz such as that manufactured and marketed under the tradename Min-U-Sill by the Pennsylvania Glass Sand Company and having a particle size in the range of from 1 to 20 microns is also to be included in this group. Other suitable semi-reinforcing fillers include calcium carbonate and titanium dioxide and the like.

The semi-reinforcing fillers may be present in the subject composition at concentrations of up to 300 parts by weight for each 100 parts by weight of the uncured silicone elastomer or even more. The upper limit for both the reinforcing and semi-reinforcing fillers is that point at which there is a rather steep decline in the physical properties such as tensile strength. Preferably, these fillers are used at the highest concentration possible within the limits of the practitioner's particular application since this condition provides the most economical composition.

It is to be emphasized that, in general, the subject radiation cured compositions have properties which are comparable to those of the peroxide cured compositions with the notable exceptions of the improvement in the tear strength and elongation and/or the improvement in other properties caused by a higher degree of cure. From this, it is evident that the subject composition may be used in almost any application wherein the peroxide cured compositions have proved successful and many more.

The elastomers produced in accordance with the practice of this invention show an improvement in several properties when compared to the conventional peroxide cured elastomers. This is unexpected since there is nothing in the art which would indicate that changing from a peroxide curing technique to a radiation curing technique would provide such an improvement. Furthermore, the improvement in properties does not correlate well with the degree of cure as indicated by the volume swell ($v_2$) in toluene. Therefore, it is not possible to simply attribute this improvement in properties to the change in the degree of cure.

EXAMPLE I

The uncured resin compositions used in the development of this invention were typically prepared in accordance with conventional practices; that is, the uncured silicone resin was first banded onto a two roll laboratory mill and then the filler-monomer blend was added as the resin was masticated. The monomer and the filler were blended prior to the addition of the resin to ensure a uniform distribution of the monomer throughout the resin and to ensure intimate contact between the surface of the filler and the monomer.

The radiation source employed herein was a Radiation Dynamics 1.5 MEV Electron Accelerator. The maximum current capacity is 15 milliamps which yields 22,500 watts of power. The samples were irradiated by placing them on a motorized cart which runs past the exit of the accelerator. The radiation dose is controlled by varying cart speeds, current and/or the number of passes. In these particular examples, these resin samples were exposed to an electron beam current of 4.2 milliamps and the cart moved at a speed of 40 centimeters per second which provided a dose of about 1/4 Mrad per pass.

In this particular example, 100 parts by weight of a VMQ resin supplied by Dow Corning under the tradename Silastic 430 were banded onto the two roll mill. As the material was masticated, a uniform blend of about 40 parts by weight of a reinforcing silica filler marketed by Pittsburgh Plate Glass Company under the tradename HiSil 233 and three parts by weight of PEGDMA, marketed by Sartomer Resins Company under the tradename SR-210, was added.

Once the ingredients were thoroughly blended, the composition was stripped from the mill and compression molded into tensile slabs at a temperature of about 50° C. for a period of from about 5 to 8 minutes. To prevent deformation of the sample, the mold was cooled to about 15° C. before demolding. The samples were then placed in a polyethylene bag which was flushed with nitrogen, sealed and then irradiated.

Irradiating the samples in a nitrogen atmosphere, as compared to air, promoted reproducible results by eliminating any effects oxygen may have on the surface of the sample. It is believed that no curing occurred during the molding or masticating steps. The samples were exposed to a radiation dose of about 4 Mrads which provided a cure factor of about 12. No attempt was made to relate the cure factor to the cross-link density.

In Table I, the tear strength and the elongation of the radiation cured samples produced in this example are compared with similar properties of peroxide cured samples of the Silastic 430 containing 40 parts by weight of HiSil 233 which has been cured with about 1½ parts by weight of DiCup R which is a commercially available curing agent, dicumyl peroxide marketed by Hercules Incorporated. In addition, data on similar peroxide cured elastomers which received a postcure radiation dose of 1 Mrad is included. Also included in Table I is the tear strength and elongation of radiation cured samples prepared in accordance with the procedures described above with the exception that the cross-linking monomer was omitted.

It is evident from Table I, that the radiation cured silicone elastomers which did not contain the subject monomer show no improvement in properties over the conventional peroxide cured resin. Furthermore, a peroxide silicone elastomer having one of the subject acrylic cross-linking monomers did not exhibit any improvement in properties even if subjected to a postcuring radiation treatment of 1 Mrad. Comparatively, the tear strength and the elongation of the subject radiation cured silicone which contained a cross-linking monomer were significantly improved.

From this, it is evident that there is a synergistic effect provided by the subject combination of the cross-linking monomer with the radiation curing. At this point, the reason why a radiation method of curing a monomer modified silicone resin produces the improved properties is not thoroughly understood. However, from the data in the first table, it is evident that both the radiation and the cross-linking monomer contribute to the cured elastomer and that there are limits on the suitable range of the radiation dose and the monomer concentration.

These limits may be more readily understood in view of the attached drawing which is a graph of the tear strength versus the "cure factor." From this, it is evident that if the "cure factor," as defined herein, is maintained below about 45 that a significant improvement in tear strength is achieved. Furthermore, it is evident from Tables I and II that the improvement in tear strength is accompanied by a significant improvement in elongation if the "cure factor" is held at or below about 20.

In addition, from Table III, it is evident that the degree of cure may be increased by increasing the monomer concentration and/or the dose to provide an elastomer having improved high temperature oil resistance with elongation properties equivalent to those of peroxide cured elastomers. However, in an effort to increase the degree of cure, the monomer concentration should not exceed about 8 parts by weight per 100 parts of silicone and the dose should not exceed about 8 Mrads, and the "cure factor" should not exceed about 45. These limits are evident from Table III.

TABLE I

A COMPARISON OF RADIATION CURED AND PEROXIDE CURED SILICONE COMPOSITIONS

| Composition Ingredient | Parts by Weight | Curing System | Postcure Radiation Dose | Tear[1] Strength (lb./in.) | Elongation[2] % |
|---|---|---|---|---|---|
| 1. Silastic 430 | 100 | peroxide | — | 54 | 390 |
| HiSil 233 | 40 | | | | |
| (No Monomer) | | | | | |
| 2. Silastic 430 | 100 | peroxide | 1 Mrad | 54 | 390 |
| HiSil 233 | 40 | | | | |
| (No Monomer) | | | | | |
| 3. Silastic 430 | 100 | radiation | — | 67 | 395 |
| HiSil 233 | 40 | (8 Mrads) | | | |
| (NO Monomer) | | | | | |
| 4. Silastic 430 | 100 | peroxide | — | 64 | 350 |
| HiSil 233 | 40 | | | | |
| PEGDMA | 3 | | | | |
| 5. Silastic 430 | 100 | peroxide | 1 Mrad | 62 | 350 |
| HiSil 233 | 40 | | | | |
| PEGDMA | 3 | | | | |
| 6. Silastic 430 | 100 | radiation | — | 110 | 590 |
| HiSil 233 | 40 | (4 Mrads) | | | |
| PEGDMA | 3 | | | | |
| 7. Silastic 430 | 100 | radiation | — | 97 | 610 |
| HiSil 233 | 40 | (4 Mrads) | | | |
| TMPT | 2 | | | | |

[1] ASTM D-624-73 die B
[2] ASTM -412 die C at 20 inches/min.

EXAMPLE II

In accordance with the procedures put forth in Example I, an additional series of experiments were conducted. This data which involved both the VMQ and the PVMQ elastomers, containing both of the preferred acrylic cross-linking monomers is put forth in Table II and in the attached drawing. The volume swell ($v_2$) data has also been included to provide an estimate of the degree of cure. The ($v_2$) data were taken by immersing the sample in toluene at 25° C. until equilibrium was reached which usually required about 5 days. This is a conventional method of estimating the extent of cure of rubbers and elastomers. The reported figure, ($v_2$), is the ratio of the original volume of the sample to the equilibrium volume of the sample plus the solvent after immersion.

From the data in Table Ii, it is evident that a significant increase in the elongation at break and the tear strength may be obtained by the subject curing technique. Furthermore, to obtain both the improved tear strength and the improved elongation properties, it is evident that the monomer concentration and the radiation dose must be maintained within certain limits. In general, the upper limit in monomer concentration is about 8 (phr) and the upper limit of the dose is about 8 and the product of the two, that is the "cure factor" should not exceed about 20. However, it is also evident that improved tear strength may be achieved at "cure factors" above 20 at the sacrifice of the elongation properties.

TABLE II

| Composition | | Cure | Cure Factor | Volume Swell ($v_2$) | Tensile Strength lb./in.$^2$ | Tear Strength lb./in. | Elongation at Break % |
|---|---|---|---|---|---|---|---|
| VMQ | (100) | | | | | | |
| TMPT | (2) | 4 | 8 | 0.2698 | 800 | 97 | 610 |
| HiSil 233 | (40) | 8 | 16 | 0.3201 | 760 | 66 | 365 |
| VMQ | (100) | 2 | 12 | 0.2506 | 450 | 110 | 555 |
| TMPT | (6) | 4 | 24 | 0.3054 | 630 | 81 | 415 |
| HiSil 233 | (40) | 8 | 48 | 0.3580 | 660 | 70 + 65 | |
| VMQ | (100) | 4 | 12 | 0.263 | 770 | 135 | 590 |
| PEGDMA | (3) | 8 | 24 | 0.318 | 780 | 85 | 385 |
| HiSil 233 | (40) | 16 | 48 | 0.3378 | 730 | 56 | 275 |
| VMQ | (100) | 4 | 24 | 0.310 | 685 | 80 | 470 |
| PEGDMA | (6) | 6 | 36 | 0.341 | 710 | 73 | 365 |
| HiSil 233 | (40) | 8 | 48 | 0.3554 | 725 | 63 | 310 |
| VMQ | (100) | 2 | 18 | 0.269 | 300 | 54 | 310 |
| PEGDMA | (9) | 4 | 36 | 0.342 | 580 | 72 | 330 |
| HiSil 233 | (40) | 8 | 72 | 0.387 | 690 | 62 | 240 |
| PVMQ | (100) | 4 | 16 | 0.210 | 500 | 115 | 405 |
| TMPT | (4) | 8 | 32 | 0.2703 | 600 | 87 | 305 |
| HiSil 233 | (40) | | | | | | |
| PVMQ | (100) | 4 | 24 | 0.2257 | 450 | 85 | 445 |
| TMPT | (6) | 8 | 48 | 0.2862 | 590 | 68 | 310 |
| HiSil 233 | (40) | 16 | 96 | 0.321 | 640 | 120 | 220 |
| PVMQ | (100) | 8 | 24 | 0.247 | 670 | 120 | 445 |
| PEGDMA | (3) | 16 | 48 | 0.276 | 710 | 71 | 335 |
| HiSil 233 | (40) | 32 | 96 | 0.3175 | 720 | 40 | 175 |
| PVMQ | (100) | 6 | 36 | 0.264 | 590 | 78 | 410 |
| PEGDMA | (6) | 12 | 72 | 0.312 | 650 | 64 | 250 |
| HiSil 233 | (40) | 24 | 144 | 0.345 | 570 | 47 | 135 |
| PVMQ | (100) | 4 | 36 | 0.246 | 320 | 63 | 306 |
| PEGDMA | (9) | 8 | 72 | 0.303 | 520 | 60 | 235 |
| HiSil 233 | (40) | 16 | 144 | 0.333 | 620 | 63 | 200 |
| Peroxide Cured Elastomer Resin (Controls) 1.5 phr DiCup | | | | | | | |
| VMQ | (100) | — | — | 0.268 | 720 | 54 | 390 |
| HiSil 233 | (40) | — | — | — | — | — | — |
| PVMQ | (100) | — | — | 0.226 | 860 | 62 | 450 |
| HiSil 233 | (40) | — | — | — | — | — | — |

EXAMPLE III

To demonstrate the advantages of curing the silicone elastomer to a greater extent and yet maintaining elongation properties which are about equivalent to the peroxide-cured systems, high temperature oil resistance tests were run on some of the examples listed in Table II. These tests were conducted in accordance with the procedures outlined in ASTM Test Specification D-471-68. The test consisted of immersing the samples in ASTM #3 Oil for 70 hours at 150° C., and then measuring the change in volume. The data from this experiment is put forth in Table III.

By comparing the ($v_2$) data, the elongation data and the oil swell of the peroxide cured VMQ composition, (i.e. composition #1) with similar data of the radiation cured monomer modified compositions having equivalent elongation properties (e.g. compositions #3 and #4 cured at 8 Mrads) it is apparent that a significant reduction in the oil swell is obtained by curing to a greater extent as measured by the ($v_2$) data.

TABLE III

A Comparison of the High Temperature Oil Resistant Properties of Silicone Elastomers Cured by the Subject Method and those Cured by Conventional Peroxide Techniques

| | Dose Mrad | Cure Factor | Volume Swell ($v_2$) | Elongation % | Oil Swell |
|---|---|---|---|---|---|
| A. Peroxide Cured Composition | | | | | |

TABLE III-continued

A Comparison of the High Temperature Oil Resistant Properties of Silicone Elastomers Cured by the Subject Method and those Cured by Conventional Peroxide Techniques

|  |  | Dose Mrad | Cure Factor | Volume Swell (v₂) | Elongation % | Oil Swell |
|---|---|---|---|---|---|---|
|  | 1. VMQ (100) | — | — |  |  |  |
|  | Hisil 233 (40) | — | — | 0.268 | 390 | 31 |
|  | DiCup R (1.5) | — | — |  |  |  |
|  | 2. PVMQ (100) | — | — |  |  |  |
|  | HiSil 233 (40) | — | — | 0.226 | 450 | 59 |
|  | DiCup R (1.5) | — | — |  |  |  |
| B. | Radiation Cured, Monomer Modified Compositions |  |  |  |  |  |
|  | 3. VMQ (100) | 4 | 8 | 0.269 | 610 | 30 |
|  | HiSil 233 (40) |  |  |  |  |  |
|  | TMPT (2) | 8 | 16 | 0.320 | 365 | 26 |
|  | 4. VMQ (100) | 4 | 12 | 0.263 | 590 | 30 |
|  | HiSil 233 (40) |  |  |  |  |  |
|  | PEGDMA (3) | 8 | 24 | 0.318 | 385 | 26 |
|  | 5. VMQ (100) | 4 | 24 | 0.310 | 470 | 28 |
|  | HiSil 233 (40) | 6 | 36 | 0.341 | 365 | 25 |
|  | PEGDMA (6) | 8 | 48 | 0.355 | 310 | 26 |
|  | 6. VMQ (100) | 2 | 18 | 0.269 | 310 | 33 |
|  | HiSil 233 (40) | 4 | 36 | 0.342 | 330 | 27 |
|  | PEGDMA (9) | 8 | 72 | 0.387 | 240 | 24 |
|  | 7. PVMQ (100) | 8 | 24 | 0.247 | 445 | 47 |
|  | HiSil 233 (40) | 16 | 48 | 0.276 | 335 | 43 |
|  | PEGDMA (3) | 32 | 96 | 0.318 | 175 | 35 |

While my invention has been described in terms of certain specific embodiments, it will be appreciated that other forms thereof could readily be adapted by one skilled in the art. Therefore, the scope of my invention is not to be limited to the specific embodiments disclosed.

What is claimed is:

1. An elastomer comprising the high energy electron beam radiation induced reaction product of a uniform mixture comprising about 100 parts by weight of a silicone elastomer selected from the group consisting of methyl vinyl silicone (VMQ) and phenyl vinyl methyl silicone (PVMQ), from about 2 to about 8 parts of a polyfunctional acrylic monomer selected from the group consisting of trimethylolpropanetrimethacrylate and polyethylene glycol dimethacrylates and a filler, said monomer and filler being thoroughly blended prior to the preparation of said uniform mixture, said elastomer having a "cure factor" of less than 45.

2. A tear resistant elastomer having improved elongation properties, said elastomer comprising the high energy electron beam radiation induced reaction product of a uniform mixture comprising about 100 parts by weight of a silicone elastomer selected from the group consisting of methyl vinyl silicone (VMQ) and phenyl vinyl methyl silicone (PVMQ) and from about 2 to about 6 parts of a polyfunctional acrylic monomer selected from the group consisting of trimethylolpropanetrimethacrylate and polyethylene glycol dimethacrylates and a filler, said monomer and filler being thoroughly blended prior to the preparation of said uniform mixture, said elastomer having a "cure factor" less than about 20.

3. A tear resistant silicone elastomer being improved elongation properties, said elastomer comprising the high energy electron beam radiation induced reaction product of a uniform mixture comprising about 100 parts by weight of a silicone elastomer selected from the group consisting of methyl vinyl silicone (VMQ) and phenyl vinyl methyl silicone (PVMQ), and about 10 to 60 parts by weight of a reinforcing filler, said filler being blended with from about 2 to about 6 parts by weight of a polyfunctional acrylic monomer selected from the group consisting of trimethylolpropanetrimethacrylate and polyethylene glycol dimethacrylates prior to the preparation of said uniform mixture, said elastomer having a "cure factor" less than about 20.

4. A tear resistant elastomer having improved elongation properties, said elastomer comprising the high energy electron beam radiation induced reaction product of a uniform mixture comprising about 100 parts by weight of a silicone elastomer selected from the group consisting of methyl vinyl silicone (VMQ) and phenyl vinyl methyl silicone (PVMQ) and from about 50 to about 300 parts of a semi-reinforcing filler, said filler being blended with from about 2 to about 6 parts of a polyfunctional acrylic monomer selected from the group consisting of trimethylolpropanetrimethacrylate and polyethylene glycol dimethacrylates prior to the preparation of said uniform mixture, said elastomer having a "cure factor" less than about 20.

5. An article formed from a tear resistant silicone elastomer having improved elongation properties, said elastomer comprising the high energy electron beam radiation induced reaction product of a uniform mixture comprising about 100 parts by weight of a silicone elastomer selected from the group consisting of methyl vinyl silicone (VMQ) and phenyl vinyl methyl silicone (PVMQ) and from about 2 to about 6 parts of a polyfunctional acrylic monomer selected from the group consisting of trimethylolpropanetrimethacrylate and polyethylene glycol dimethacrylate, and a filler, said monomer and filler being thoroughly blended prior to the preparation of said uniform mixture, said elastomer having a "cure factor" less than about 20.

6. A method of forming a tear resistant silicone elastomer having improved elongation properties comprising the steps of:

(a) forming a uniform mixture comprising by weight, about 100 parts silicone elastomer selected from the group consisting of vinyl methyl silicone (VMQ)

and phenyl vinyl methyl silicone (PVMQ) and from about 2 to about 6 parts of a polyfunctional acrylic monomer selected from the group consisting of trimethylolpropanetrimethacrylate and polyethylene glycol dimethacrylate, which monomer has been previously blended with a filler; and (b) subjecting said mixture to a high energy electron beam radiation dose of from about 2 to about 8 Mrads, and wherein said method, the "cure factor" of said elastomer does not exceed about 20.

7. A method of forming a silicone elastomer comprising the steps of:

(a) forming a uniform mixture comprising by weight, about 100 parts silicone elastomer selected from the group consisting of vinyl methyl silicone (VMQ) and phenyl vinyl methyl silicone (PVMQ) and from about 2 to about 8 parts of a polyfunctional acrylic monomer selected from the group consisting of trimethylolpropanetrimethacrylate and polyethylene glycol dimethacrylate, which monomer has been previously blended with a filler; and (b) subjecting said mixture to a high energy electron beam radiation dose of from about 2 to about 8 Mrads; and wherein said method, the "cure factor" of said elastomer does not exceed about 45.

8. A method of forming a tear resistant silicone elastomer having improved elongation properties comprising the steps of:

(a) forming a uniform mixture comprising 100 parts of dimethyl methyl vinyl silicone and from about 10 to about 60 parts of a reinforcing silica filler said filler being blended with from about 2 to about 6 parts of a polyfunctional acrylic monomer selected from the group consisting of trimethylolpropanetrimethacrylate and polyethacrylate and polyethylene glycol dimethacrylates prior to the preparation of said uniform mixture; and (b) subjecting said mixture to a high energy electron beam radiation dose of from about 2 to 10 Mrads, wherein said method, the "cure factor" of said elastomer does not exceed about 20.

* * * * *

UNITED STATES PATENT AND TRADEMARK OFFICE
CERTIFICATE OF CORRECTION

PATENT NO. : 4,158,617
DATED : June 19, 1979
INVENTOR(S) : Roger J. Eldred

It is certified that error appears in the above-identified patent and that said Letters Patent are hereby corrected as shown below:

Column 1, in the title, change "Silicon" to -- Silicone --.

Column 2, line 52, "Desired" should read -- desires --.

Column 7, line 52, "Table Ii" should read -- Table II --.

Column 9, line 61, "being" should read -- having --.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*